March 28, 1967 R. L. BRADY ET AL 3,311,891

RECIRCULATING MEMORY DEVICE WITH GATED INPUTS

Filed Aug. 21, 1963 2 Sheets-Sheet 1

INVENTORS
RICHARD L. BRADY
BERNARD R. GANDLER

BY

John H. Holcombe

AGENT

RECIRCULATING MEMORY DEVICE WITH GATED INPUTS

Filed Aug. 21, 1963 2 Sheets-Sheet 2

United States Patent Office 3,311,891
Patented Mar. 28, 1967

3,311,891

RECIRCULATING MEMORY DEVICE WITH GATED INPUTS

Richard L. Brady and Bernard R. Gandler, San Jose, Calif., assignors to International Business Machines Corporation, New York, N.Y., a corporation of New York Filed Aug. 21, 1963, Ser. No. 303,963
11 Claims. (Cl. 340—172.5)

This invention relates to data storage apparatus and more particularly to data signal storage apparatus capable of storing, either temporarily or for indefinite periods, digital data information received in the form of electrical signals.

In data signal transmission systems it is often desirable to provide input/output adapters to interconnect incompatible data sources and receivers. Such input/output adapters may incorporate data storage apparatus, such as magnetic disk or drum storage devices, to permit interconnection either of high speed data sources to low speed data receivers or of low speed data sources to high speed data receivers. Such data storage apparatus is usually called a "time buffer" when used in input/output adapters.

Heretofore, such input/output adapters were extremely complicated and costly. One previously used type of input/output adapter required extensive synchronizing means to synchronize the adapter to the data source, required additional circuitry controlled by the synchronizing means to gate the data received from the data source to the time buffer, and required further synchronizing means to synchronize the adapter to the data receiver, and also additional circuitry controlled by the second synchronizing means to gate the data to be transmitted from the time buffer to the data receiver.

Another type of input/output adapter previously used avoided the cost and complication of synchronizing the adapter to the data source and data receiver. But, in order to operate without synchronization, it required, not only a first register to temporarily store data as it was received from the data source and a second register to temporarily store the data as it was transmitted to the data receiver; it also required (1) a "write status" circuit to write indicator bits on a separate track of the time buffer simultaneously with the recording of data on other tracks of the time buffer, this indicator being an indication that data was present on its associated sector of the time buffer; (2) a complex "read status" circuit to read the indicator bits and, if a data request signal is received from the data receiver in coincidence with the indicator, to gate out the data associated with the detected indicator, and, if no such coincidence is achieved, to block the output gate, so that the data is not read out, and also write a second indicator in a second track of the time buffer to indicate that the data is still there; and (3) additional circuitry to read the second channel and, if an indicator is detected, block the first register to prevent it from supplying data to the associated sector of the time buffer.

Accordingly, it is an object of the invention to provide a simplified data storage system.

It is another object of the invention to provide a data storage system which is not synchronized with the apparatus supplying the data information which is to be stored, and which does not require additional "status" information bits to indicate the presence or absence of stored data information in the data storage system.

Still another object of the invention is to provide data storage system which reads the information data stored therein as the indication of the presence or absence of such data in the data storage system.

A further object of this invention is to provide apparatus to accomplish data transfer to a data receiver without being synchronized with the data receiver, and without requiring a coincidence between the data request signal and "status" indicator bits to gate information data stored in the apparatus to the data receiver.

A still further object of this invention is to provide an improved data storage system which may be used as an input/output adapter that is adaptable to a wide variety of data sources and data receivers operating at various speeds.

A still further object of this invention is to provide an improved data storage system which may be used as an input/output adapter that is simpler and of lower cost of construction than those of the prior art.

In accordance with the invention, therefore, there is provided an input control system for selectively storing in a storage medium, data manifestations received from a data source, which system momentarily stores that data in an input buffer register, reads the entire sector of the storage medium which is next to be available for reading to indicate whether that sector is empty or full, and, if the sector is empty, gates the data which was received from the data source and momentarily stored in the input buffer register directly to the storage medium, and, if the sector is full, to rewrite the data read from the storage medium back into the storage medium.

In addition, the same system may be utilized to transmit to a data receiver the data manifestations stored in the storage medium. This is accomplished by arranging the disclosed system to read each data information sector in the storage medium as it becomes available, and if a data request signal is received from the data receiver while that sector is being read, to transmit the information stored in the sector to the data receiver, and, if no data request is received from the data receiver, to rewrite the information back into the storage medium.

Objects and advantages other than those set forth above will be apparent from the following description of the preferred embodiments of the invention. In the drawings.

*General description*

Figure 1:
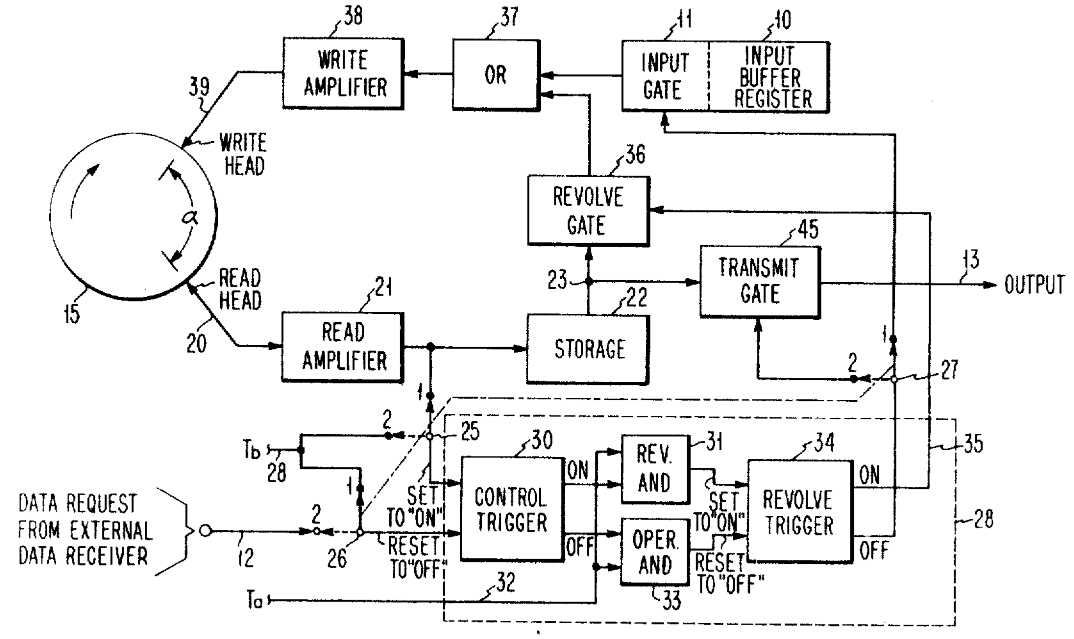
FIG. 1 is a simplified block diagram of a preferred embodiment of a data information storage system constructed in accordance with the principles of this invention.

Referring to FIG. 1, there are illustrated components of a system, shown in block form, comprising a preferred embodiment of the invention. Since the particular electric components of this circuitry form no portion of the present invention and since many varieties of suitable circuitry are well known in the art, only the functionally labeled blocks are illustrated.

In general, when the system shown is operating as an input control system, the input data received from the data source (not shown) will be supplied to the Input Buffer Register 10, which will store the data until Input Gate 11 is operated. When the system shown is operating as an output control system, it will respond to a Data Request signal from the external data receiver (not shown) appearing on line 12 by transmitting data over Output line 13 to the data receiver.

Storage Medium 15 is the primary storage device in the system and its function is to store for an indefinite period data information supplied to it from Input Buffer Register 10 by Input Gate 11. It will store the data information until that data is transmitted to the external data receiver over Output line 13. Storage Medium 15 may be any one of a number of types of storage devices, as will be pointed out more particularly in the Detailed Description. For the purpose of illustrating the invention, the Storage Medium 15 is shown as one track of a magnetic drum. The output of the storage device is Read Head 20 which reads all the information stored on the one track of Storage Medium 15 and supplies that information to Read Amplifier 21.

Second Storage Means 22 is provided in order to give the data storage system sufficient time to determine, when operating as an input control system, whether or not data is present in the portion of Storage Medium 15 being read and, when operating as an output control system, whether or not a data request has been supplied by the data receiver. Read Amplifier 21 supplies the data information to Second Storage Means 22 which stores the information for a certain time period.

Assuming that the system is operating as an input control system, when such data information is present at the output of Read Amplifier 21, it is an indication that the portion of Storage Medium 15 being read by Read Head 20 is full and that data received from the external data source cannot be stored therein. In order for the system to operate as an input control system, Switch 25, 26 and 27 is set to position 1. Read Amplifier 21 will then also supply its output to Control Circuit 28 through Switch 25. Control Circuit 28 includes: Control Trigger 30, Revolve And circuit 31, Operate And circuit 33 and Revolve Trigger 34.

In order to prevent Input Gate 11 from gating new data to Storage Medium 15 from Input Buffer Register 10 when the portion of Storage Medium 15 being read is already full, the Control Circuit responds to the presence of an output from the Read Amplifier to block Input Gate 11 and to open Revolve Gate 36 at a specified later time, as will be explained in the Detailed Description. The Revolve Gate 36 will then allow the information stored in the Second Storage Medium 22 to be supplied through OR circuit 37 to Write Amplifier 38 and Write Head 39, rewriting the information on Storage Medium 15. This method of reading data and rewriting it is called "revolving," and is explained more thoroughly in Digital Computer Components and Circuits, R. K. Richards, 1957, page 297.

In the event that no information is stored in the portion of Storage Medium 15 being read by the Read Head 20, Read Amplifier 21 will supply no output, indicating that that portion of Storage Medium 15 is empty and the data received from the external data source may be stored therein. The Control Circuit will respond to the absence of an output from Read Amplifier 21 to open Input Gate 11 at a specified later time, thus allowing Input Buffer Register 10 to supply the information received from the data source and stored momentarily therein to the Write Amplifier 38 and Write Head 39. Write Head 39 will then write such information into the open sector of the Storage Medium 15. Thus, the illustrated system has operated as an input control system, and was not required to be synchronized to the data source.

In order for the system shown in FIG. 1 to operate as an output control system, Switch 25, 26 and 27 is set to position 2. Read Head 20 will read all the information stored on Storage Medium 15 and will continue to supply this information through Read Amplifier 21 to Second Storage Means 22.

In order for the external data receiver (not shown) to request data from the data storage system, the data receiver supplies a data request on line 12. The Control Circuit 28 will respond to a data request signal appearing on line 12 by operating Transmit Gate 45, as will be explained in the Detailed Description, at a specified later time to thereby allow Second Storage Means 22 to supply the information stored therein to Output line 13. The Control Circuit will respond to an absence of such a data request on line 12 to operate Revolve Gate 36, allowing the Second Storage Means 22 to supply the information stored therein to Write Head 39. Write Head 39 will then rewrite the information on the first Storage Medium 15. Thus, the disclosed system responds to data requests by supplying an output, and in the absence of such a request will revolve or recycle the stored information.

*Detailed description*

The data supplied from the external data source (not shown) is received by Input Buffer Register 10 and is stored therein until Input Gate 11 is operated. Input Buffer Register 10 and Input Gate 11 may be any one of a number of types of circuits which are jointly capable of temporarily storing data supplied them and gating out that data in response to an "operating" pulse, which pulse will be supplied by Control Circuit 28, as will be hereinafter described in detail. Examples of such types of circuits are described in Pulse and Digital Circuits, Millman and Taub, 1956, on pages 411–419, 425–427, and 429–457. Input Buffer Register 10 may be capable of accepting data from the external data source even though the disclosed system is operating as an output control system, but the Control Circuit will not operate Input Gate 11 until the system is operating as an input control system.

When the system is set to operate as an output control system, a positive pulse appearing on line 12, which represents a data request from the external data receiver (not shown), causes the system to transmit the data stored therein on Output line 13. Since the disclosed system is not synchronized with the external data receiver, the external data receiver may be provided with an input buffer register similar to Register 10 at its input. This would allow the data receiver to accept data appearing at Output line 13 and store that data until such time as it is desired for use.

The data supplied the disclosed system is eventually stored on Storage Medium 15. As mentioned in the General Description, Storage Medium 15 may be any one of a number of types of storage devices. The only requirement is that data information written into storage be made available to a reading means after a definite delay. This may be accomplished by the use of a magnetic drum, as illustrated in FIG. 1, a magnetic disk, or a magnetic tape. In either case, one channel of the recording medium (magnetic drum, disk or tape) would provide at least one "record" which is divided into a number of "sectors," for example, 10 sectors. For the purpose of illustration, a sector is arbitrarily designated to provide storage capable of containing digital data manifestations representative of a single alphabetic or numeric character. Due to the large physical size of the normal magnetic drum or disk, a single channel comprises a large number of such records, for example, 100. An endless tape would have a configuration similar to that of a drum or disk, as would a reel to reel tape, however, a reel to reel tape would have to be rewound onto the supply reel and restarted from the beginning when the end of the tape is reached. In all the above recording mediums, the reading transducer should follow the writing transducer by a distance $\alpha$, the distance of any number of records less one sector.

Another type of storage medium which could be utilized is a delay line. Such a delay line may provide a delay equivalent to any number of "records" less one "sector" as defined above. The writing means would then be merely the input to the delay line and the reading means the output.

Even a permanent storage device, such as a magnetic core memory, may be utilized. In such case, the writing means would be an electrical circuit for sequentially inserting digital data manifestations into the memory, and the reading means would be an electrical circuit for sequentially reading out the data stored therein in the order that such data was inserted by the writing means. The core memory need be only large enough to store the equivalent of a single "record" as defined above, but can be made larger if desired.

Any one of many other types of storage devices may be used if they accomplish the purpose described above. Examples of the various storage devices contemplated are described in Digital Computer Components and Circuits, R. K. Richards, 1957, on pages 263–395.

Assuming for the purpose of illustration that the Storage Medium 15 in FIG. 1 is a magnetic drum, a Read Head 20 is provided to read all of the data manifestations stored on the associated track of the magnetic drum. The Read Head 20 supplies electrical signals representative of the data manifestations to Read Amplifier 21 which amplifies the data signals supplied it. If it is desired, Read Amplifier 21 may be provided with additional well-known circuitry to either "shape" the electrical signals into better defined pulses representative of the data read by Read Head 20, or similarly well-known circuitry to synchronize the timing of such pulses with the other circuit elements shown in FIG. 1, or both types of circuitry may be used. The Radiation Laboratory Series, vol. 19, "Waveforms," B. Chance, illustrates examples of various types of circuitry for amplifying, "shaping" and/or synchronizing various signals on pages 17–37, 188–189, 469, 586, 767–774.

The output of Read Amplifier 21 is then supplied to a Second Storage Medium 22. Storage Medium 22 may be any of the types of storage mediums discussed above with respect to Storage Medium 15; however, Storage Medium 22 must store the data information supplied it for a delay time equivalent to one "character" time, the time required for one sector on Storage Medium 15 to pass under Read Head 20 (a "sector" having been defined for the purpose of illustration as being capable of storing data representative of a single character), and supply an output signal representative of such information to node 23 at such time.

*Input control system—Description*

For the system shown in FIG. 1 to operate as an input control system, Switch 25, 26 and 27 must be set to position 1. Switch 25, 26 and 27 may be any type of well-known switching means, such as a manual switch, a relay, a set of electronic or semiconductor "gates," etc. With Switch 25, 26 and 27 set to position 1, positive pulses ($T_b$) appearing on line 28 during each character time from a timing source (not shown) will be directed by Switch 26 to the Reset to "OFF" input of Control Trigger 30. Since an object of the invention is to avoid the necessity of synchronizing the disclosed system with either the external data source or the external data receiver, the timing signal source providing timing signal $T_b$ is not connected to any external device and is internal to the disclosed system. Control Trigger 30 may be any of a number of types of well-known trigger circuits having two stable states, which are called "ON" and "OFF" states. The pulse appearing at the Reset to "OFF" input will set the Trigger to the "OFF" state if it was not already in that state. Thereafter, any data pulses appearing at the output of Read Amplifier 21 will be directed through Switch 25 to the Set to "ON" input of Control Trigger 30, turning the trigger "ON." Whenever Control Trigger 30 is turned "ON," it remains "ON" until time $T_b$ of the following character time, when a timing pulse appears on line 28 and is directed through Switch 26 to the Reset to "OFF" input of Control Trigger 30. If Control Trigger 30 was in the "ON" state, such input will reset the trigger to the "OFF" state. If not, the input will have no effect, and the trigger will remain in the "OFF" state.

At time $T_a$, which immediately precedes time $T_b$ during each character time and is at the beginning of the character time, a timing pulse is supplied by a timing signal source (not shown) on line 32 to Revolve And circuit 31 and to Operate And Circuit 33. As was the case with timing signal $T_b$, the timing signal source providing timing signal $T_a$ is not synchronized with any external device. These circuits may take any one of the many forms of the well-known "AND," "gate" or "coincidence" circuits in the prior art. If Control Trigger 30 is in the "ON" state, the pulse appearing on line 32 will actuate Revolve And circuit 31 at time $T_a$. If, however, the trigger is in the "OFF" state, Operate And circuit 33 will be actuated by the pulse on line 32. If Revolve And circuit 31 is actuated, it will provide a pulse to the Set to "ON" input of Revolve Trigger 34. Revolve Trigger 34 may, as in the case of Control Trigger 30 be any type of well-known trigger. A pulse appearing at the Set to "ON" input sets Revolve Trigger 34 to the "ON" state, if it was not already in that state. If Operate And circuit 33 is actuated, it will supply a pulse to the Reset to "OFF" input of the trigger, turning the trigger "OFF."

When Revolve Trigger 34 is "ON," it will supply a signal on line 35 to thereby actuate Revolve Gate 36. During the time that Revolve Gate 36 is so actuated, any data supplied by Second Storage Means 22 to node 23 will be gated to OR circuit 37. Revolve Gate 36 may be any type of well-known "gate" circuit, the function of which is, when operated, to transmit any signals supplied thereto, and, when not operated, to block (prevent transmission of) any signal supplied thereto. Second Shortage Means 22 is arranged to supply the data stored by it during the time period $T_{data}$ (the time period comprising the remainder of a character time after the end of pulses $T_a$ and $T_b$) of a first character time, to node 23 during the time period $T_{data}$ of the following character time by its own internal mechanism. Thus, the data stored during $T_{data}$ of the first character time will be applied to OR circuit 37 during $T_{data}$ of the second character time, if Revolve Gate 36 has been actuated.

If, however, Revolve Trigger 34 is in the "OFF" state, it will supply a signal at its "OFF" output which will be directed through Switch 27 to Input Gate 11, actuating that gate. When Input gate 11 is so actuated, it causes data present in Input Buffer Register 10 to be supplied serially to OR circuit 37 as long as Revolve Trigger 34 remains "OFF." Input Gate 11 may comprise any suitable circuitry, depending upon the nature of Input Buffer Register 10, in the same manner as in the case of Revolve Gate 36 and Storage Means 22 as explained above. OR circuit 37 passes all signals appearing at either of its two inputs to Write Amplifier 38. OR circuit 37 may be any one of a number of various well-known "OR" circuits, including a soldered connection between the two input leads and the output lead, if the nature of the gates 11 and 36 allows. Write Amplifier 38 may, similarly to Read Amplifier 21, amplify, shape, and/or synchronize the date signals supplied it by OR circuit 37, and supply the resultant output to Write Head 39. Write Head 39 then writes the data supplied it onto Storage Medium 15.

*Input control system—Operation*

Figure 2:
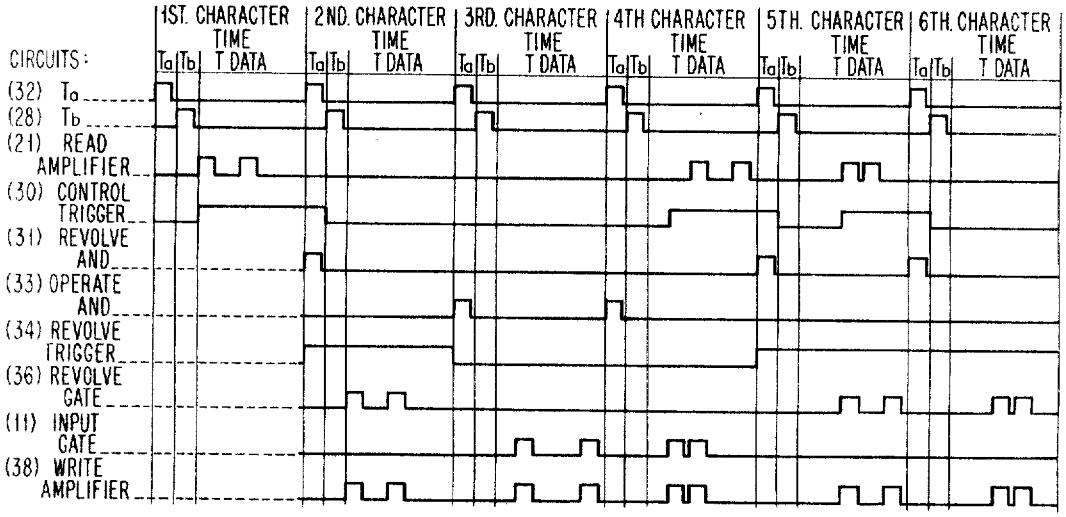
FIG. 2 is a family of curves illustrating the timing relationship of various signals in the apparatus of FIG. 1 when utilized as an input control system.

To illustrate the operation of the described circuit, reference must be made to FIG. 2. The waveforms shown represent the electrical signals present either on the lines listed at the left along the axis of ordinates or on the outputs of the circuits also listed at the left. The character times which define the abscissa refer to the times at which the sectors representing such character times are under Read Head 20. The same-numbered sectors of the following record appear under Write Head 39, one character time later. For example, when the first sector of the first record is under Read Head 20, representative of the first character time, the last sector of the first record is under Write Head 37; and one character time later, which is the second character time, the first sector of the second record will appear under Write Head 39. The waveforms shown in FIG. 2 represent illustrative operations of the circuit when Switch 25, 26 and 27 is in position 1. It is assumed that data has already been written in the sectors of the first record representing the first, fourth and fifth character times, as illustrated by the output of Read Amplifier 21.

The data representations illustrated comprise a 2-out-of-5 code, wherein the numeric characters "0" through "9" are represented by various permutations of 2 data bits or pulses appearing in 2 out of the 5 allocated times. Any well-known code may be used, and the time period alloted for time $T_{data}$ may be altered as desired to accommodate data representations of a desired number of alphabetic and/or numeric characters (or, "words" which comprise a plurality of characters). However, the time delay provided by Storage Medium 15 and by Second Storage Medium 22, as well as the repetition rate of timing pulses $T_a$ and $T_b$, must be altered in accordance with the time period selected for $T_{data}$.

Remembering that Read Head 20 and Write Head 39 are spaced apart by a distance $\alpha$, assume for the purpose of illustration that $\alpha$ equals one record only less one sector (a sector being capable of containing digital data manifestations representative of a single alphabetic or numeric character). Therefore, in the "revolve" operation a character read by Read Head 20 in the first sector of the record is delayed one character time by the circuit and then written by Write Head 39 in the first sector of a second record. Thus, a character present in any sector is continually revolved into the same sector of the following records until such time as the system operates as an output control system and erases the character, as will be described later in the specification.

Beginning with the first character time, illustrated in FIG. 2, Read Head 20 (in FIG. 1) will sense the data written in the first sector of the first record and supply electrical signals representative of such data to Read Amplifier 21. Read Amplifier 21 will amplify and possibly shape and/or synchronize such input signals, producing the output signal illustrated in FIG. 2. This output is then supplied to the Second Storage Means 22, which provides the delay of one character time.

To illustrate the input control system under various circumstances of operation, the operation will be described, first, when data is present in the sector of Storage Medium 15 being read by Read Head 20; second, when data is not present in the following sector; third, when data is not present in the third sector, so that two consecutive sectors are read which do not have data stored therein; fourth, when data is present in the fourth sector; and fifth, when data is present in the fifth sector, so that two consecutive sectors are read, both of which have data stored therein. The presence or absence of data in Storage Medium 15 is shown by the output waveform of Read Amplifier 21 in FIG. 2 during the appropriate character time.

The output of Read Amplifier 21 is also supplied, through Switch 25, to the Set to "ON" input of Control Trigger 30. Control Trigger 30 has been previously reset to "OFF" by a timing signal appearing at time $T_b$ on line 28 through Switch 26. Thus, the presence of data appearing at the Set to "ON" input of Control Trigger 30 at any time during the period comprising the first character time after time $T_b$ will turn the trigger "ON," causing it to provide a signal at its "ON" output, as is shown in FIG. 2. Control Trigger 30 will remain at the "ON" state until reset by the $T_b$ timing signal appearing during the next (second) character time. Thus, Control Trigger 30 has responded to the presence of data in the first sector of the first record of Storage Medium 15 by establishing an "ON" signal.

The "ON" output of Control Trigger 30 is supplied to Revolve And circuit 31 where, at time $T_a$, a timing signal is provided on line 32, and, in conjunction with the signal from Control Trigger 30, operates Revolve And circuit 31 to provide the output illustrated in FIG. 2 during the second character time. The output of Revolve And circuit 31 is applied to the Set to "ON" input of Revolve Trigger 34. This input will turn "ON" Revolve Trigger 34 as shown in FIG. 2, providing an output signal on line 35. The signal on line 35 energizes Revolve Gate 36 so that the gate will remain open for the duration of the signal on line 35 and thereby pass all data appearing at node 23 during that time. Remembering that it has been assumed for the purpose of illustration that Second Storage Means 22 will supply the data stored by it during the first character time to node 23 during the time period $T_{data}$ of the second character time by its own internal mechanism, Revolve Gate 36 completes the circuit from node 23 to OR circuit 37. Therefore, the data stored during $T_{data}$ of the first character time will be applied to OR circuit 37 during $T_{data}$ of the second character time.

OR circuit 37 supplies the data to Write Amplifier 38, which similarly to Read Amplifier 21, may amplify, shape, and/or synchronize the data signals. Write Amplifier 38 then supplies the resultant output shown in FIG. 2 to Write Head 39 which writes the data on Storage Medium 15.

Thus, Read Head 20 has sensed data in the first sector of the first record appearing on Storage Medium 15, Read Amplifier 21 has supplied this data to Second Storage Means 22 and to Control Trigger 30, Control Trigger 30 has responded to the presence of this data to actuate Revolve Trigger 34 during the second character time, and Revolve Trigger 34 has operated Revolve Gate 36 to gate the output from Second Storage Means 22 to Write Amplifier 38 and Write Head 39 so that the data is then written, during the second character time, into the first sector of the second record on Storage Medium 15. In this manner, the data appearing in the first sector of the first record has, by its mere presence, caused the Control Circuit 28 to revolve that same data into the first sector of the second record.

Referring now to the second sector of the first record, the second character time shown in FIG. 2, it will be noted that immediately after Revolve Trigger 34 was turned "ON" by the conjunction of the "ON" signal from Control Trigger 30 and timing signal $T_a$ at the beginning of the second character time, Control Trigger 30 is turned off by timing signal $T_b$ appearing on line 28.

Assuming that no data appears in the second sector of the first record appearing on Storage Medium 15, no output appears from Read Amplifier 21. Thus, nothing is fed into Second Storage Means 22, and, since no signal appears at the Set to "ON" input of Control Trigger 30, the trigger remains "OFF," providing an output signal to Operate And circuit 33.

At time $T_a$ of the third character time, a timing signal appears on line 32 causing Operate And circuit 33 to produce an output, as shown in FIG. 2, which output is supplied to the Reset to "OFF" input of Revolve Trigger 34. This causes Revolve Trigger 34 to turn "OFF" dropping the signal on line 35 and thereby closing Revolve Gate 36. At the same time, Revolve Trigger 34 provides a signal to Switch 27 which is directed to Input Gate 11. Input Gate 11 is thereby opened for the entire time that Revolve Trigger 34 remains in the "OFF" state.

Data supplied by the external data source has previously been placed in Input Buffer Register 10 temporarily. When Input Gate 11 is actauted, it causes data appearing in Input Buffer Register 10 to be supplied serially to OR circuit 37 as long as Revolve Trigger 34 remains "OFF."

The data thus supplied OR circuit 37 is transmitted to Write Amplifier 38, which operates on the data signals, as described above, and supplies its output to Write Head 39, which writes the data into the second sector of the second record appearing on Storage Medium 15.

Thus, Control Trigger 30 and Operate And circuit 33 have responded to the *absence* of data appearing in the second sector of the first record to turn "OFF" Revolve Trigger 34 and thereby actuate Input Gate 11 to supply data from the external data source, which data has been temporarily stored in Input Buffer Register 10, to Write Amplifier 38 and Write Head 39, to write such data in the second sector of the second record. It is seen that the Control Circuit 28 has thus responded to the absence of data in a sector, as the indication that that sector is available for use, to gate the data from the external data source to that sector as it appears in the second record.

The waveforms further shown in FIG. 2 illustrate additional operations of the circuit, and will be discussed for the purpose of clarification. During the third character time, the timing pulse $T_b$ appearing on line 28 will have no effect on Control Trigger 30, since the trigger is already in the "OFF" state. Assuming that no data is present in the third sector of the first record, Read Head 20 and Read Amplifier 21 produce no output signal, so no signal appears at the Set to "ON" input to Control Trigger 30. Therefore, Control Trigger 30 remains in the "OFF" state supplying a signal to Operate And circuit 33. At time $T_a$ of the fourth character time, a timing signal appears on line 32 to actuate Operate And circuit 33 to supply a signal to the Reset to "OFF" input of Revolve Trigger 34. This signal has no effect on the trigger since it also was already in the "OFF" state. Revolve Trigger 34 therefore continues to provide a signal to Input Gate 11 to maintain the gate in the "OPEN" state. Input Gate 11 and Input Buffer Register 10 continue to serially transmit data to OR circuit 37 and thence to Write Amplifier 38 and Write Head 39, to write such data in the third sector of the second record of Storage Medium 10.

At time $T_b$ of the fourth character time, the timing signal appearing on line 28 has no effect on Control Trigger 30, the trigger remaining in the "OFF" state. Data is assumed to be present in the fourth sector of the first record, so Read Amplifier 21 transmits such data to Second Storage Means 22 and to the Set to "ON" input of Control Trigger 30, switching the trigger to the "ON" state. This provides an input to Revolve And circuit 31, which, in conjunction with timing signal $T_a$ appearing on line 32, transmits a signal to the Set to "ON" input of Revolve Trigger 34, switching that trigger to the "ON" state. Revolve Trigger 34 then turns off Input Gate 11 and operates Revolve Gate 36 during the fifth character time. Second Storage Means 22 then supplies the stored data to Revolve Gate 36 which transmits the data through OR circuit 37 to Write Amplifier 38 and Write Head 39, revolving the data into the fourth sector of the second record.

The timing signal appearing on line 28 at time $T_b$ of the fifth character time resets Control Trigger 30 to the "OFF" state. However, the data appearing in the fifth sector of the first record, and transmitted by Read Amplifier 21, sets Control Trigger 30 to the "ON" state. Therefore, when timing signal $T_a$ of the sixth character time appears on line 32, Revolve And circuit 31 again supplies an input to the Set to "ON" input of Revolve Trigger 34. This signal has no effect on the trigger as it is already in the "ON" state. Revolve Gate 36 remains open and Second Storage Means 22 transmits the stored data through Gate 36 and OR circuit 37 to Write Amplifier 38, which causes the data to be written in the fifth sector of the second record.

Thus, it is to be noted that it is the mere presence or absence of data in a particular sector which operates the Control Circuit 28 to either revolve the data present in the sector, or to gate data from the external data source into an open sector. No "write status" circuit is provided, or is necessary, to write indicator data on a separate "status channel" of Storage Medium 15 to indicate that data is present in any sector of the Storage Medium 15. The only indicator used by the disclosed circuit is the presence or absence of the information data itself.

It is obvious from the above that the function of Control Circuit 28 is to respond to the presence of a signal at the output of Read Amplifier 21 at any time during $T_{data}$ of any character time by operating Revolve Gate 36 during the following character time. The function of the Control Circuit is also to respond to the absence of a signal at the output of Read Amplifier 21 during the time $T_{data}$ of any character time to operate only Input Gate 11 during the following character time. Therefore, it is contemplated that any circuit which accomplishes the stated function will lie within the scope of the disclosed data storage system.

Figure 3:
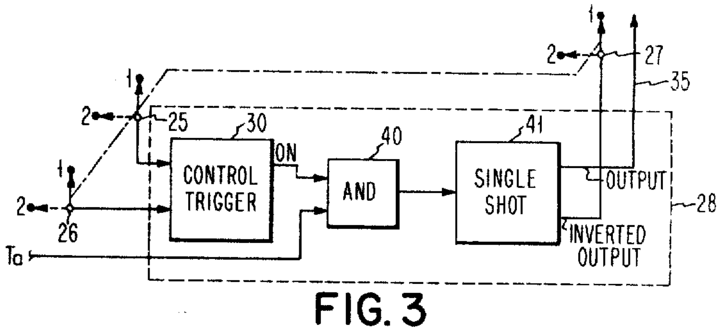
FIG. 3 is a simplified block diagram of another embodiment of the apparatus shown within the dotted lines 28 of FIG. 1.

One such contemplated equivalent circuit, shown in FIG. 3, is the replacement of circuits 31, 33, and 34 of FIG. 1 by an AND circuit 40 and a "Single-Shot" circuit 41. And circuit 40 would respond to the conjunction of timing signal $T_a$ and a signal at the "ON" output of Control Trigger 30 by providing a signal to the input of Single-Shot circuit 41. The Single-Shot would respond to the signal by providing a signal of proper duration (at least to include all time $T_{data}$) on line 35 to Revolve Gate 36. The Inverted Output of Single-Shot circuit 41, which is the inverse of the Output signal, is supplied to Input Gate 11. If the Single-Shot circuit is incapable of providing an inverted output, an inverter would be provided to respond to the output of the Single-Shot circuit by providing a signal which is the inverse of that output and supply that signal to Input Gate 11. Thus, Input Gate 11 and Revolve Gate 36 will always be in opposite states. Such "Single-Shot" circuits are well-known in the prior art and are often called "monostable multivibrators." Examples of such multivibrators are illustrated and described in Pulse and Digital Circuits, Millman and Taub, 1956, on pages 174–201. It should be obvious that many various combinations and permutations of various circuit elements may be involved to accomplish the function of the Control Circuit 28 described above.

*Output control system—Description*

Since most of the same components are used in the system when arranged as an output control system as were used when it was arranged as an input control system, and since the arrangement of those components is nearly the same, only the changes in connections and the additional components will be discussed.

For the system shown in FIG. 1 to operate as an output control system Switch 25, 26 and 27 must be set to position 2. The switch thereby disconnects Read Amplifier 21 from Control Trigger 30, and, instead, connects line 28 to the Set to "ON" input of Control Trigger 30 and connects the Data Request line 21 to the Reset to "OFF" input to the trigger. The switch also disconnects the "OFF" output of Revolve Trigger 34 from Input Gate 11, and instead, connects that output to Transmit Gate 45. Transmit Gate 45, the additional circuit not used in the input control system, is identical to Revolve Gate 36, discussed above. When Transmit Gate 45 is actuated by a signal received from Revolve Trigger 34 through Switch 27, it gates the output of Second Storage Medium 22 to Output line 13 and thence to the external data receiver (not shown).

Figure 4:
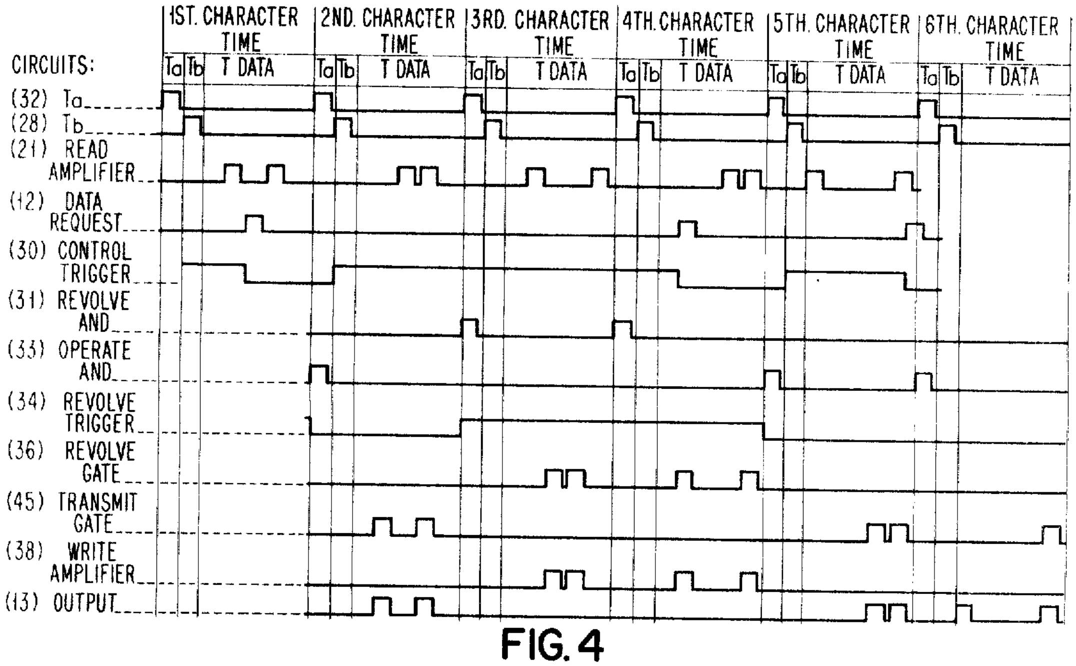
FIG. 4 is a family of curves illustrating the timing relationships of various signals in the embodiment of FIG. 1 when utilized as an output control system.

The waveforms shown in FIG. 4 illustrate the outputs of the various circuit elements listed at the left, in accordance with the operation of the system of FIG. 1 when such system is operating as an output control system.

*Output control system—Operation*

In brief, the system disclosed will respond to a data request from the external data receiver (not shown), which will appear on line 12, received at any point during the time period $T_{data}$ of any character time to operate Transmit Gate 45 during the following character time and thereby allow Second Storage Means 22 to transmit through Gate 45 to Output 13, which output is connected to the external data receiver.

To illustrate the operation of the output control system under various circumstances, its operation will be described, first, when a data request is received from the external data receiver during the first character time; second, when, during the second character time, no data request is received; third, when no data request is received during the third character time, so that no data request is received over the period comprising two consecutive character times; fourth, when a data request is received during the fourth character time; and, fifth, when during the fifth character time, another data request is received, so that data requests are received during two consecutive character times. The presence or absence of such data requests is shown by the Data Request waveform of line 12, illustrated in FIG. 4.

Assume for the purpose of illustration that data is present in the first sector of the first record of Storage Medium 15. During the first character time, Read Head 20 will read the data present in the first sector of the first record and supply that data to Read Amplifier 21. Read Amplifier 21 may, as discussed previously with respect to the input control system, amplify, shape, and/or synchronize that data, and will supply the resultant signal to Second Storage Means 22. If Control Trigger 30 had been in the "OFF" state, timing signal $T_b$ appearing on line 28 during the first character time, would set Control Trigger 30 to the "ON" state. A data request appearing on line 45 at any time during the period $T_{data}$ of the first character time will then reset Control Trigger 30 to the "OFF" state, as illustrated in FIG. 4. The trigger will then provide an output to Operate And circuit 33, which, in conjunction with timing signal $T_a$ appearing on line 32 during the second character time, will actuate Operate And circuit 33 to transmit a signal to the Reset to "OFF" input of Revolve Trigger 34, thereby switching the trigger to the "OFF" state as shown in FIG. 4. Revolve Trigger 34 will then transmit a signal through Switch 27 to actuate Transmit Gate 45 which allows Second Storage Means 22 to supply the data stored therein to the Output line 13.

Thus, the data present in the first sector of the first record has been stored in Second Storage Means 22 until the second character time, when the Control Circuit, in response to a data request from the external data receiver, which was received during the first character time, operates Transmit Gate 45 to allow Second Storage Means 22 to transmit that data to Output line 13.

In view of the discussion above, assume for the moment that no data was present in the first sector of Storage Medium 15. In such case the system would operate exactly as described above, except that "no data," i.e., blanks, would be transmitted or revolved. Since only such blanks would be present in the system, the operation of the system cannot be properly shown on a graph and, for this reason, has not been illustrated in FIG. 2. It is obvious, therefore, that the operations of the system when no data is present in the Storage Medium 15 will be the same as the operations illustrated in FIG. 2 except that no data waveforms will appear in the system or will be transmitted to the external data receiver.

Since the data has been read out of the first sector of the first record, it is desirable to eliminate the data from the first sector of the second record to indicate that that sector is now open. Therefore, assuming that Storage Medium 15 is a magnetic drum, disk or tape, the first sector of the second record must be erased. If writing means 38 and 39 are of the type that does not have a neutral, "OFF" state, but instead normally provides a magnetic field in one direction to write "ZEROS" (or as an indication that nothing is being written), and writes "ONES" by reversing the direction of that field, then such erasure will be accomplished by merely allowing the writing means to write "ZEROS." This may be accomplished by merely leaving Revolve Gate 36 blocked assuring that no positive-going signals are supplied to Write Amplifier 38. If, however, writing means 38 and 39 are not of this type, erasing means would have to be connected to Write Head 39 or to another head in proximity thereto, which would be actuated when Revolve Gate 36 is turned "OFF" so as to erase the data in the desired sector. If the Storage Medium 15 is a delay line, of a length equivalent to one record, the mere blocking of Revolve Gate 36 by Revolve Trigger 34 will prevent data from being entered into the delay line.

Thus, when the output control system receives a data request on line 12, it causes both (1) the data present in the sector of the Storage Medium 15 being read by Read Head 20 at the time the data request is received, to appear at Output 13 during the following character time, and (2) causes the same sector in the following record to be erased.

Assume for the purpose of illustration that data is present in all subsequent sectors of the first record on Storage Medium 15. During the second character time, timing signal $T_b$ will set Control Trigger 30 to the "ON" state. The data appearing in the second sector of the first record will then be read by reading means 20 and 21 and inserted into Second Storage Means 22. If no data request is received from the data receiver during the time period $T_{data}$ of the seocnd character time, Control Trigger 30 will remain "ON." Then, at the third character time, timing signal $T_a$, in combination with the "ON" signal from Control Trigger 30, will operate Revolve And circuit 31 to provide an input at the Set to "ON" input of Revolve Trigger 34. This will cause Revolve Trigger 34 to provide a signal to Revolve Gate 36, actuating the Revolve Gate to thereby allow Second Storage Means 22 to transmit the data stored therein through OR circuit 37 to Write Amplifier 38. Write Amplifier 38 may then amplify, shape and/or synchronize the data signals received, as discussed above, and transmit the resultant signal to Write Head 39, which will write the data in the second sector of the second record.

Thus, the Control Circuit 28 has responded to the absence of a data request from the external data source to revolve the data present in the second sector of the first record into the second sector of the second record. In addition, the absence of an output from Revolve Trigger 34 to Transmit Gate 45, causes that gate to block Second Storage Means 22 from providing a signal to Output line 13.

The additional waveforms shown in FIG. 4 illustrate further possible operations of the circuit, and will be discussed for the purpose of clarification.

Since Control Trigger 30 is already in the "ON" state, timing signal $T_b$ appearing during the third character time will have no effect on the trigger. As before, reading means 20 and 21 will read the data stored in the third sector of the first record and insert that data into Second Storage Means 22. Assuming no data request appears during the third character time, Control Trigger 30 will remain "ON," and its output, in combination with timing signal $T_a$ appearing during the fourth character time, will actuate Revolve And circuit 31 to provide a signal to the Set to "ON" input of Revolve Trigger 34. Since the Revolve Trigger was already in the "ON" state, the signal will have no effect. Revolve Trigger 34 will continue to supply a signal to Revolve Gate 36, maintaining the gate "OPEN" and a Second Storage Means 22 will then transmit the data through Revolve Gate 36 and OR circuit 37 to writing means 38 and 39, which will write the date into the third sector of the second record.

During the fourth character time, timing signal $T_b$ will again have no effect on Control Trigger 30, which is already in the "ON" state. However, a data request is assumed to appear on line 12, and it is applied to the Reset to "OFF" input of Control Trigger 30. This will switch the trigger to the "OFF" state, and the trigger will supply the signal to Operate And circuit 33. At the beginning of the fifth character time, timing signal $T_a$ will actuate Operate And circuit 33, which will reset Revolve Trigger 34 to the "OFF" state. Revolve Trigger 34 will then shut off the signal on line 35, thereby blocking Revolve Gate 36, and the trigger will then provide a signal to Transmit Gate 45, operating the gate and allowing Second Storage Means 22 to transmit the data through Transmit Gate 45 to Output line 13.

During time $T_b$ of the fifth character time, the timing signal appearing on line 28 will set Control Trigger 30 to the "ON" state. Reading means 20 and 21 will again read the data present in the fifth sector of the first record and supply that data to Second Storage Means 22. The data request appearing on line 12 during the fifth character time resets Control Trigger 30 to the "OFF" state. It is to be noted in FIG. 4 that the data request appears very near the end of time $T_{data}$ of the fifth character time. This is to emphasize that the data request need not be synchronized to the disclosed system, and that it will operate the circuit if it appears at any time during the period $T_{data}$ during the desired character time. The combination of timing signals $T_a$ and the "OFF" output of Control Trigger 30, will actuate Operate And circuit 33 to provide a signal to the Reset to "OFF" input of Revolve Trigger 34. Since Revolve Trigger 34 is already "OFF," the signal will have no effect on the trigger. Therefore, the trigger will continue to maintain Revolve Gate 36 closed and Transmit Gate 45 open, so that Second Storage Means 22 will transmit the data through Transmit Gate 45 to Output line 13.

The output control system described may be modified or rearranged in any of the ways mentioned with respect to the input control system disclosed above.

*Alternative embodiment*

Figure 5:
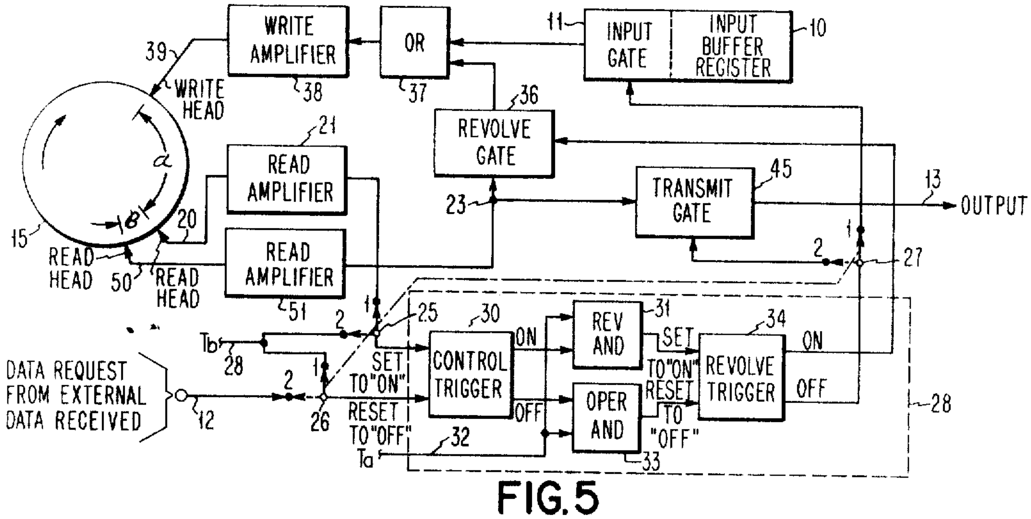
FIG. 5 is a simplified block diagram of another embodiment of a data storage system constructed in accordance with the principles of this invention.

The system shown in FIG. 5 is another embodiment of a data storage system constructed in accordance with the principles of this invention. The data storage system of FIG. 5 is the same as that shown in FIG. 1 except that the Second Storage Means 22 has been eliminated and Read Head 50 and Read Amplifier 51 have been added. Read Head 50 is spaced apart from Read Head 20 by a distance B. The distance B comprises one "sector" on Storage Medium 15, so that the sum of the distances B and $\alpha$ is equal to one "record" on Storage Medium 15.

For the system shown in FIG. 5 to operate as an input control system, Switch 25, 26 and 27 is set to position 1. Input data received from the external data source (not shown) will be supplied to the Input Buffer Register 10, which will store the data until Input Gate 11 is operated. Read Head 20 will read all the information stored on Storage Medium 15, and supply that information to Read Amplifier 21 which supplies the information through the Switch 25 to Control Circuit 28. Control Circuit 28 may consist of the same elements as shown in Control Circuit 28 of FIG. 1, or may consist of the elements shown in Control Circuit 28 of FIG. 3, or may be any equivalent control circuit. Assuming for the purpose of illustration that Control Circuit 28 of FIG. 1 is being used, the Control Circuit will respond to the presence of the output from Read Amplifier 21 to open Revolve Gate 36 one character time later, as was explained with respect to FIG. 1. Since the distance B has been defined as being one sector of Storage Medium 15, and one sector provides a delay of one character time, at the time that Control Circuit 28 operates Revolve Gate 36, Read Head 50 will begin reading the data read by Read Head 20 one character time earlier. Read Head 50 will supply the information read by it to Read Amplifier 51 which will then supply the information to node 23. Revolve Gate 36 will then allow the information to be supplied through OR Circuit 37 to write Amplifier 38 and Write Head 39, rewriting that information on Storage Medium 15. Thus, Read Head 20 and Read Amplifier 21 have read the data contained in a sector of Storage Medium 15 and supplied that information to Control Circuit 28 as an indication that data was stored in that sector and that the sector is not available to store the data received from the external data source. The Control Circuit has responded to the presence of an output from Read Amplifier 20 by blocking Input Gate 11 and by operating Revolve Gate 36 to thereby allow Read Head 50 and Read Amplifier 51 to read the same sector one character time later and supply the information stored therein to Write Amplifier 38 and Write Head 39 to Revolve the information into the same sector of the following record.

In the event that no information is stored in the sector of Storage Medium 15 being read by Read Head 20, Read Amplifier 21, will supply no output. Control Circuit 28 will respond to the absence of such output to block Revolve Gate 36 and to operate Input Gate 11 one character time later, thereby allowing Input Buffer Register 10 to supply the information received from the data source and stored momentarily therein, to Write Amplifier 38 and Write Head 39. Write Head 39 will then write such information into that open sector of Storage Medium 15.

The system shown in FIG. 5 will operate as an output control system when Switch 25, 26 and 27 is in position 2. When the Switch is in this position, Read Head 20 and Read Amplifier 20 are disconnected from the system and are not used. The other connections of the Switch are discussed with respect of FIG. 1. Control Circuit 28 will respond to a data request from the external data receiver appearing on line 12 during any character time, to block Revolve Gate 36 and to operate Transmit Gate 45 during the following character time. During this following character time, the information stored in the sector being read by Read Head 50 will be supplied to Read Amplifier 51 which will transmit that information through Transmit Gate 45 to Output line 13.

The Control Circuit will respond to an absence of such data request on line 12 during any character time to block Transmit Gate 45 and to operate Revolve Gate 36 during the following character time. Read Head 50 and Read Amplifier 51 will then supply the information being read from the sector then under Read Head 50 through Revolve Gate 36 to Write Amplifier 38 and Write Head 39 to thereby revolve the information onto the same sector of the following record.

While the invention has been particularly shown and described with reference to preferred embodiments thereof, it will be understood by those skilled in the art that the foregoing and other changes in form and details may be made therein without departing from the spirit and scope of the invention.

We claim:

1. A data storage system for storing data received from an external data source, comprising:

input means for receiving said data from said external data source;

storage means capable of storing data;

an input to said storage means; and means responsive to the presence of data in a specified time-sector of said storage means during a specified time period to gate, at the conclusion of said specified time period, said data in said specified time-sector of said storage means to said input of said storage means, said responsive means being responsive to an absence of data in said specified time-sector of said storage means during said specified time period to gate, at the conclusion of said specified time period, data appearing at said input means to said input of said storage means.

2. A data storage system for storing data received from an external data source, comprising:

input means for receiving said data from said external data source;

first storage means capable of storing data for a first time delay period, said first storage means having both an input and an output;

second storage means capable of storing data for a second time delay period, said second storage means having both an input and an output, said input of said second storage means receiving data from said output of said first storage means; and control means responsive to the presence of data at said output of said first storage means during a specified time period following the conclusion of said first time delay period to gate, at the conclusion of said second time delay period, data appearing at said output of said second storage means to said input of said first storage means, said control means being responsive to an absence of said data appearing at said output of said first storage means during said specified time period to gate, at the conclusion of said second time delay period data appearing at said input means to said input of said first storage means.

3. A system for storing data manifestations, comprising:

a system input;

first storage means, having both an input and an output, for storing data manifestations supplied to said input and for supplying at said output data manifestations equivalent to said data manifestations supplied at said input at a first specified later time;

second storage means having both an input and an output, said input being connected to receive said data manifestations supplied at said output of said first storage means, said second storage means storing said data manifestations until a second specified later time and supplying data manifestations equivalent to said stored data manifestations at said output of said second storage means at said second specified later time; and control means responsive to the presence of data manifestations at said output of said first storage means during a specified time period, said specified time period being equal to or an integral sub-multiple of the time duration between the acceptance of data manifestations by said first storage means and the time said equivalent data manifestations appear at said output of said first storage means at said first specified later time, to gate said data manifestations appearing at said output of said second storage means to said input of said first storage means at said second specified later time, said control means being responsive to an absence of said data manifestations at said output of said first storage means during said specified time period to gate said system input to said input of said first storage means at said second specified later time.

4. A system for storing data information signals received from an external data source, said data information being in the form of electrical signals representative of alphabetic or numeric characters, comprising:

a system input for receiving said data information signals from said external data source;

first storage means capable of storing data signals representing at least one character, said first storage means having both an input and an output;

second storage means capable of storing data signals representing at least one character, the number of characters capable of being stored in said second storage means being an integral sub-multiple of or equal to the number of characters capable of being stored in said first storage means, said second storage means having both an input and an output, said input of said second storage means being connected to accept data signals appearing at said output of said first storage means; and control means responsive to the presence of data signals at said output of said first storage means during a specified time period, said specified time period being the time during which data signals representing the number of characters capable of being stored in said second storage means are presented at said output of said first storage means, to gate, at the conclusion of said specified time period, data signals appearing at said output of said second storage means to said input of said first storage means, said control means being responsive to an absence of said data signals appearing at said output of said first storage means during said specified time period to gate said data information signals appearing at said system input to said input of said first storage means at said conclusion of said specified time period.

5. A data storage system for storing data received from an external data source, comprising:

an input buffer register for receiving said data from said external data source and storing said data temporarily;

movable magnetic storage means capable of storing data;

an input to said movable magnetic storage means; and means responsive to the presence of data in a specified time-sector of said movable magnetic storage means during specified time period to gate, at the conclusion of said specified time period, said data in said specified time-sector of said movable magnetic storage means to said input of said movable magnetic storage means, said responsive means being responsive to an absence of data in said specified time-sector of said movable magnetic storage means during said specified time period to gate, at the conclusion of said specified time period said data temporarily stored in said input buffer register to said input of said movable magnetic storage means.

6. A data storage system for storing data received from an external data source comprising:

an input buffer register for receiving said data from said external data source and storing said data temporarily therein;

movable magnetic storage means capable of storing data for a first time delay period, said movable magnetic storage means having both an input and an output;

second storage means capable of storing data for a second time delay period, said second storage means having both an input and an output, said input of said second storage means receiving data from said output of said movable magnetic storage means; and control means responsive to the presence of data at said output of said movable magnetic storage means during a specified time period following the conclusion of said first time delay period to gate at the conclusion of said second time delay period, data appearing at said ouput of said second storage means to said input of said movable magnetic storage means, said control means being responsive to an absence of said data appearing at said output of said movable magnetic storage means during said specified time period to gate, at the conclusion of said second time delay period, said data temporarily stored in said input buffer register to said input of said movable magnetic storage means.

7. A data storage system for storing data received from an external data source, comprising:

an input buffer register for receiving said data from said external data source and storing said data temporarily therein;

movable magnetic storage means capable of storing data;

an input to said movable magnetic storage means;

trigger means responsive to the presence of data in a specified time-sector of said movable magnetic storage means during a specified time period to provide an electrical signal at a first output, said trigger means being responsive to an absence of data in said specified time-sector of said movable magnetic storage means during said specified time period to provide an electrical signal at a second ouput; and
means responsive to said electrical signal provided by said trigger means at said first output to gate, at the conclusion of said specified time period, said data in said specified time-sector of said movable magnetic storage means to said input of said movable magnetic storage means, said responsive means being responsive to said electrical signal provided by said trigger means at said second output to gate, at the conclusion of said specified time period, data temporarily stored in said input buffer register to said input of said movable magnetic storage means.

8. A data storage system for storing data received from an external data source, comprising:
an input buffer register for receiving said data from said external data source and storing said data temporarily;
movable magnetic storage means capable of storing data;
an input to said movable magnetic storage means;
trigger means responsive to the presence of data in a specified time-sector of said storage means during a specified time period to supply an electrical signal; and
means responsive to the presence of said electrical signal supplied by said trigger means to gate, at the conclusion of said specified time period, said data in said specified time-sector of said movable magnetic storage means to said input of said movable magnetic storage means, said responsive means being responsive to an absence of said electrical signal from said trigger means to gate, at the conclusion of said specified time period, data stored in said input buffer register to said input of said movable magnetic storage means.

9. A data storage and transmission system for transmitting data stored therein to an external data receiver, comprising:
first storage means capable of storing data for a first time delay period and having said data to be transmitted stored therein, said first storage means having both an input and an output;
second storage means capable of storing data for a second time delay period, said second storage means having both an input and an output, said input of said second storage means receiving data from said output of said first storage means;
transmission means for transmitting data to said external data receiver;
signal means associated with said external data receiver for supplying a data request signal; and
control means responsive to said data request signal supplied by said signal means during said second time delay period to gate, at the conclusion of said second time delay period, data appearing at said output of said second storage means to said transmission means, said control means being responsive to an absence of said data request signal from said signal means during said second time delay period to gate, at the conclusion of said second time delay period, data appearing at said output of said second storage means to said input of said first storage means.

10. A system for storing data information, said data information being in the form of electrical signals representative of alphabetic or numeric characters, and for selectively transmitting data information signals stored therein to an external data receiver, comprising:
transmission means for transmitting data information signals to said external data receiver;
movable magnetic storage means, having both an input and an output, for storing data information signals supplied to said input and for supplying at said output data information signals equivalent to said data information signals supplied at said input at a first specified later time, said movable magnetic storage means having data information signals previously stored therein;
second storage means having both an input and an output, said input being connected to receive said data information signals supplied at said output of said movable magnetic storage means, said second storage means storing data information signals until a second specified later time and supplying data information signals equivalent to said stored data information signals at said output of said second storage means at said second specified later time;
signal means associated with said external data receiver for supplying a data request signal;
trigger means responsive to said data request signal supplied from said signal means during a specified time period, said specified time period being equal to or an integral sub-multiple of the time duration between the acceptance of data information signals by said movable magnetic storage means and the time said equivalent data information signals appear at said output of said movable magnetic storage means at said first specified later time, to supply an electrical signal at a first output, said trigger means being responsive to an absence of said data request signals from said signal means during said specified time period to supply an electrical signal at a second output; and
means responsive to said electrical signal and said first output of said trigger means to gate, at said second specified later time, said data information signals appearing at said output of said second storage means to said transmission means, said responsive means being responsive to an electrical signal at said second output of said trigger means to gate, at said second specified later time, said data information signals appearing at said output of said second storage means to said input of said movable magnetic storage means.

11. A system for storing data information, said data information being in the form of electrical signals representative of alphabetic or numeric characters, and for selectively transmitting data information signals stored therein to an external data receiver, comprising:
transmission means for transmitting data information signals to said external data receiver;
movable magnetic storage means capable of storing data information signals representing at least one character, said movable magnetic storage means having both an input and an output;
second storage means capable of storing data signals representing at least one character, the number of characters capable of being stored in said second storage means being an integral sub-multiple of, or equal to, the number of characters capable of being stored in said movable magnetic storage means, said second storage means having both an input and an output, said input of said second storage means being connected to accept data information signals appearing at said output of said movable magnetic storage means;
signal means associated with said external data receiver for supplying a data request signal;
trigger means responsive to the presence of said data request signal supplied by said signal means during a specified time period, said specified time period being the time during which data information signals representing the number of characters capable of being stored in said second storage means are presented at said output of said movable magnetic storage means, to supply an electrical signal; and means responsive to the presence of said electrical signals supplied by said trigger means to gate, at the conclusion of said specified time period, data information signals appearing at said output of said second storage means to said transmission means, said responsive means being responsive to an absence of said electrical signal from said trigger means to gate, at the conclusion of said specified time period, data signals appearing at said output of said second storage means to said input of said movable magnetic storage means.

References Cited by the Examiner

UNITED STATES PATENTS

| | | | |
|---|---|---|---|
| 2,988,735 | 6/1961 | Everett et al. | 340—174.1 |
| 3,122,726 | 2/1964 | King et al. | 340—174.1 |

References Cited by the Applicant

UNITED STATES PATENTS

| | | |
|---|---|---|
| 3,050,717 | 8/1962 | Hoberg et al. |

BERNARD KONICK, *Primary Examiner.*

V. P. CANNEY, *Assistant Examiner.*